April 5, 1955
W. R. BECK
2,705,647
SHUTTLE CAR SHOCK ABSORBER
Filed Aug. 12, 1953
3 Sheets-Sheet 1
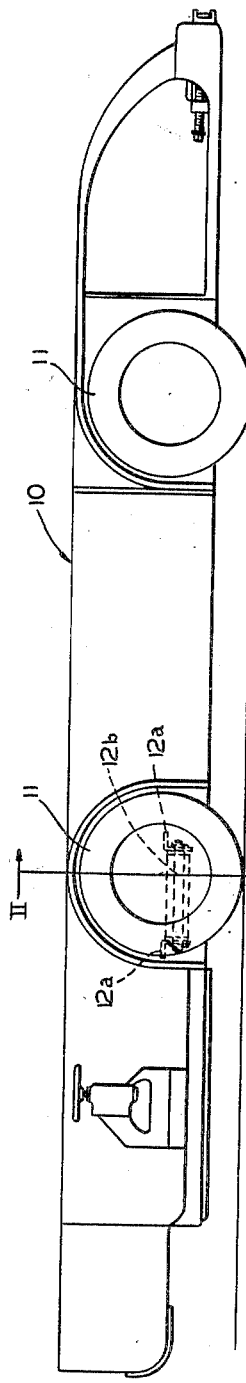
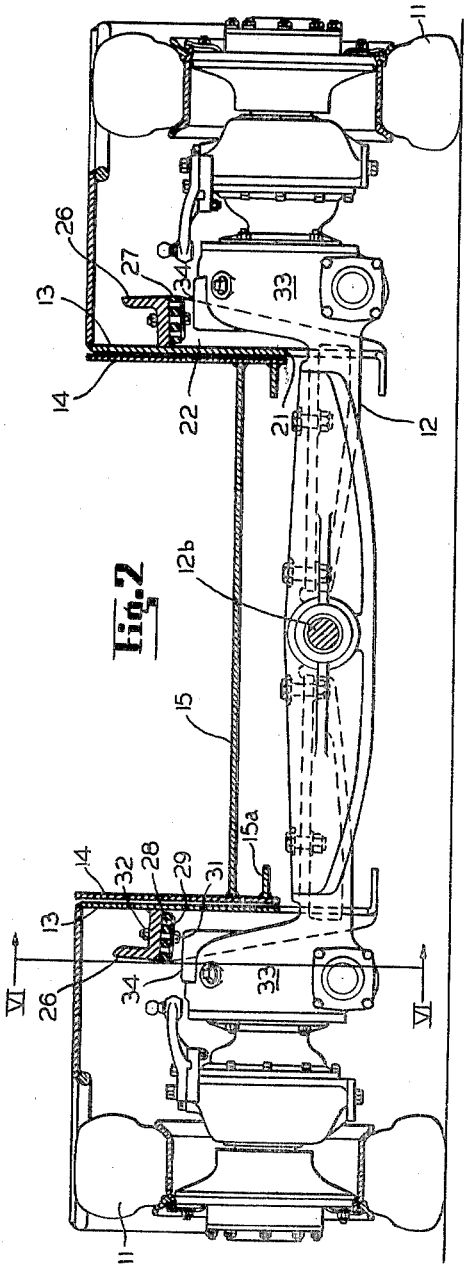
INVENTOR.
WILLIAM R. BECK
BY
Murray A. Gleeson
ATTORNEY April 5, 1955 W. R. BECK 2,705,647
SHUTTLE CAR SHOCK ABSORBER
Filed Aug. 12, 1953 3 Sheets-Sheet 2

INVENTOR.
WILLIAM R. BECK
BY
Murray A. Gleeson
ATTORNEY

April 5, 1955  W. R. BECK  2,705,647
SHUTTLE CAR SHOCK ABSORBER
Filed Aug. 12, 1953  3 Sheets-Sheet 3

INVENTOR.
WILLIAM R. BECK
BY
Murray A. Gleeson
ATTORNEY

United States Patent Office 2,705,647
Patented Apr. 5, 1955

2,705,647

SHUTTLE CAR SHOCK ABSORBER

William R. Beck, Chicago, Ill., assignor to Goodman Manufacturing Company, Chicago, Ill., a corporation of Illinois Application August 12, 1953, Serial No. 373,774

2 Claims. (Cl. 280—111)

This invention relates to improvements in shuttle cars and, more particularly, to shock absorbers or bumpers especially adapted for use with the axle of a shuttle car which is usually mounted for pivotal movement on a longitudinal axis at the middle of the car frame which, together with a rigid axle at the other end of the car, provides a 3-point equalizing suspension for travel over uneven ground.

The space limitations in mines usually require the design of a shuttle car with minimum road clearance beneath its material-carrying compartment, so that there is little vertical space beneath the car frame for movement of the pivotal axle. Consequently, the ends of the axle frequently bump against the superposed portion of the vehicle frame with a constant clattering and banging, which is damaging to the car, and hard on the operator.

Attempts have been made to impose rubber bumper blocks between the lower edges of the car frame and the axle, but this has been found unsatisfactory because such blocks tend to limit still further the available space for pivoting movement of the axle, and to complicate the assembly of the axle in such limited space. Furthermore, the dirt, oil and grime accumulating on the rubber bumpers so near the ground have a deteriorating effect on the rubber used. Still further, the location of such rubber bumpers on the lower edges of the main frame, relatively close to the axis of its pivotal support, causes unnecessarily high loads on the bumpers.

Among the objects of the present invention is to provide an improved form and arrangement of bumpers for shuttle car axles, wherein the bumpers are located on the exterior face of the car frame where there is much more room available for adequate bumper material and for ease in assembly, where the bumpers are farther removed from dirt and oil on the ground, and are also farther removed from the pivotal support of the axle, so as to overcome the several disadvantages of prior bumper arrangements above set forth.

Other objects and advantages will appear from time to time as the following description proceeds.

The invention may best be understood by reference to the accompanying drawing, in which:

Figure 1 is a side view of a shuttle car constructed in accordance with my invention;

Figure 2 is a fragmentary enlarged section taken on line II—II of Figure 1;

Figure 3:
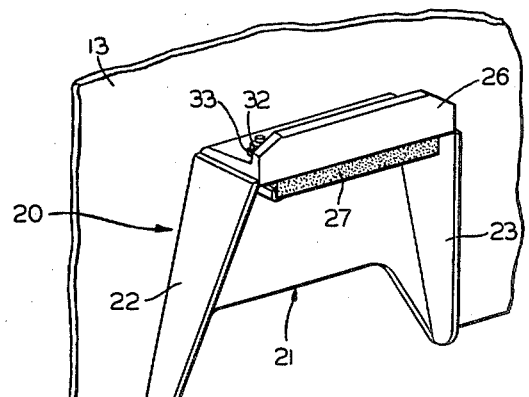
Figures 3 and 4 are fragmentary perspective views, partially from above and below, respectively, of the bumper mounting on the car side plate.
Figure 4:
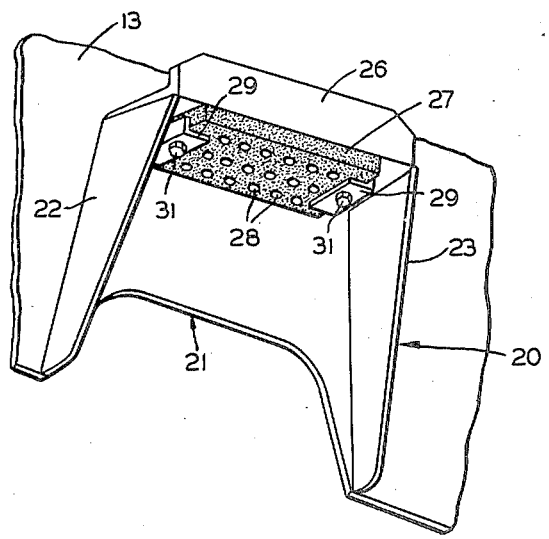

Referring now to details of the embodiment of the invention shown in the drawings, a shuttle car having a main frame indicated generally at 10 is provided as usual with rubber-tired wheels 11, 11 which may be driven and steered in any well-known manner.

The wheels at the discharge end of the car, shown toward the left side of Figure 1, are mounted as usual for equalizing movement on opposite ends of an equalizer bar or axle 12. Side frame members 13, 13 extend lengthwise of the main frame and are cross-connected at suitable intervals, including angle bars 12a between which the equalizer bar 12 is pivoted centrally of the car as by pivot pin 12b. Such an equalizing structure is well known in the art and need not be further described.

A material-carrying compartment extends substantially the full length of the car and includes a pair of upright side walls 14 which, in the form shown, comprise reenforcing portions fixed to the inner side faces of the frame members 13. The bottom of the material-carrying compartment consists of a flat bottom plate 15 spanning the side walls 14, 14. A flight conveyor 16 has its upper reach movable by power, as usual, along the top of the bottom plate 15 for unloading material from one end of the compartment. The lower reach of the conveyor may be supported on flanges 15a along the lower edges of the side walls 14.

Referring now to the bumpers forming the subject of the present invention, a pair of arch-like bumper supports indicated generally at 20, 20 are fixed as by welding to the outer faces of the side frames 13 and span the downwardly opening cut-out portions 21 in said side plates within which the ends of the equalizing bar or axle 12 are vertically movable.

Each of the bumper supports 20 consists of spaced upright plates 22 and 23 welded edgewise to the side frame 13 and joined at their upper ends by an angle plate 26, which is also welded to the side frame 13.

A pad of rubber or of rubber-like material 27, preferably having a plurality of perforations as at 28, is secured along the under face of the angle plate 26 by retaining plates 29, 29, having fastening bolts 31, 31 passing upwardly through said retaining plates, the pad 27, and the angle plate 26, with nuts 32 secured to the upper ends of the bolts above the angle plate.

The adjacent part of the equalizing bar or axle 12 has, as usual, a housing 33 upstanding from the main part of the equalizer bar along and spaced from the side frame 13, to form an upwardly offset support for the stub axle 11a of the adjacent wheel 11. In the form shown herein, the housing 33 also encloses drive gearing for the wheel, but it will be manifest that the same general form of upwardly offset stub axle support will be employed regardless of whether or not the wheel is power driven. In either case, the upper end of the housing 33 is provided with a widened upper pad or abutment face 34, adapted for flatwise engagement with the pad 27 on the adjacent arched bumper support 20.

Figure 5:
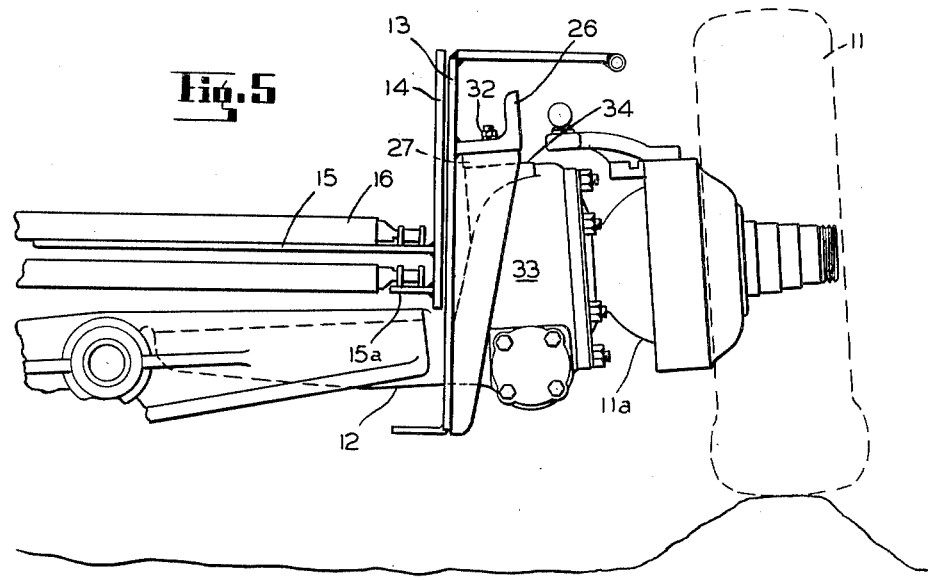
Figure 5 is a fragmentary detail section similar to Figure 2, but showing one end of the axle in tilted bumping position.
Figure 6:
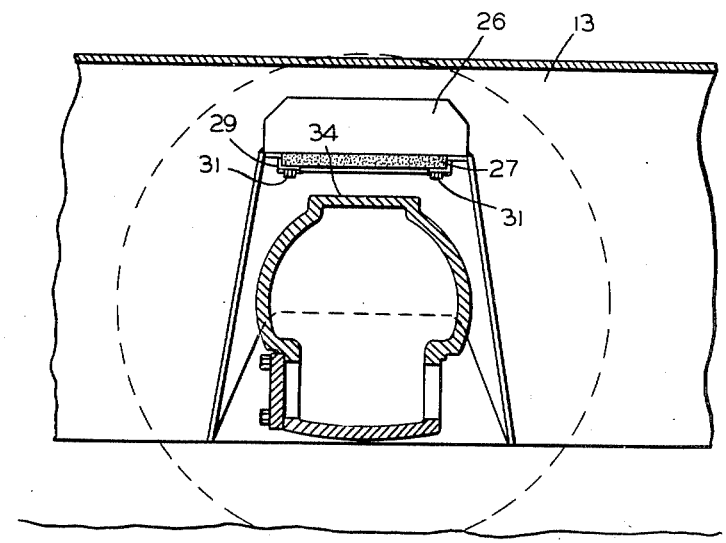
Figure 6 is a section taken on line VI—VI of Figure 2, but with the drive gearing in the axle housing omitted.

The face of pad 27 is preferably disposed at a slight upward and outward angle relative to the pad 34 on the axle housing, so that latter pad, which normally is approximately horizontal, will engage pad 27 flatwise when the equalizer bar reaches its limit of pivotal movement, as shown in Figure 5. In the form shown, the pad 34 on the pivoted axle is formed integrally with the housing (see Figure 6), but manifestly said pad can, if desired, be provided with a facing of rubber or other resilient material.

From the above description, it will now be understood that the novel arrangement of the bumper supports 20 provides ample vertical room along the outer sides of the side frames 13, to permit the use of a substantial thickness of resilient cushioning material on either, or both, coacting bumper pad faces 27 and 34, without taking up any vertical space beneath the material-receiving compartment or side frames, which otherwise would either limit the pivotal movement of the equalizer bar, or add to the total height of the car. It will also be observed that the arched construction reenforces the side plates 13, 13 at the notched areas 21, 21; and that the stresses resulting from bumping impact are distributed through the top cross piece 26 and the side plates 22, 23 over a wide area of the shuttle car side plates, thereby preventing distortion. Moreover, the arrangement of the bumper pads 27 in overhead position removes them from the dirt and grime on the mine floor, and also aids in assembling the pivoted equalizer bar 12 on the main frame, since said bar can be readily inserted in the open cut-away portions 21, 21 in the side frame after the bumper devices have been installed.

Although I have shown and described a certain embodiment of my invention, it will be understood that I do not wish to be limited to the exact construction

I claim:

1. In a shuttle car, a main frame including a pair of laterally spaced upright side frame members and a floor plate fixed on said frame defining a material compartment, said side frame members having downwardly opening cut-away portions, wheel-supporting means for said frame including a transverse equalizer bar pivotally mounted at the center of said frame beneath the material compartment extending through said cut-away portions, and having upwardly offset end portions with stub axles thereon, and bumper means for said equalizer bar comprising arched reinforcing members fixed to the exterior faces of the side frame members and spanning said cut-away portions, said arched reinforcing members having downwardly facing bumper pads substantially above the lower edges of the side frame members, and the adjacent upwardly offset portions of the equalizer bar having bumper pads at their upper ends in position to engage said first-named bumper pads when said equalizer bar reaches a predetermined limit of pivotal movement, at least one of said pads being provided with a resilient cushioning surface.

2. A shuttle car structure in accordance with the preceding claim, wherein the coacting sets of bumper pads at each side of the frame are disposed at such an angle to each other that they engage each other substantially flatwise when their respective equalizer bar ends are swung to a predetermined limit of movement relative to the adjacent side frame members.

References Cited in the file of this patent

UNITED STATES PATENTS

| | | |
|---|---|---|
| 1,389,648 | Kadow | Sept. 6, 1921 |
| 1,765,764 | Jett | June 24, 1930 |